(12) United States Patent
Morris et al.

(10) Patent No.: US 11,707,949 B2
(45) Date of Patent: Jul. 25, 2023

(54) TIRE INFLATION SYSTEM WITH PARALLEL FLOW PATH

(71) Applicant: Hendrickson USA, L.L.C., Schaumburg, IL (US)

(72) Inventors: Jeffrey S. Morris, Canton, OH (US); Jesse W. Cervantez, Navarre, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 720 days.

(21) Appl. No.: 16/851,153

(22) Filed: Apr. 17, 2020

(65) Prior Publication Data
US 2020/0338937 A1    Oct. 29, 2020

Related U.S. Application Data

(60) Provisional application No. 62/837,226, filed on Apr. 23, 2019.

(51) Int. Cl.
*B60C 23/00* (2006.01)

(52) U.S. Cl.
CPC .. *B60C 23/00354* (2020.05); *B60C 23/00372* (2020.05)

(58) Field of Classification Search
CPC ................ B60C 23/00354; B60C 23/00372
See application file for complete search history.

(56) References Cited

U.S. PATENT DOCUMENTS

| | | | |
|---|---|---|---|
| 4,117,281 A | 9/1978 | Leimbach | |
| 5,425,393 A | 6/1995 | Everett | |
| 5,921,532 A | 7/1999 | Pierce et al. | |
| 6,257,597 B1 | 7/2001 | Galazin | |
| 6,401,743 B1 | 6/2002 | Naedler | |
| 6,412,789 B1 | 7/2002 | Pierce et al. | |
| 8,245,746 B2 | 8/2012 | Stanczak et al. | |
| 8,528,611 B2 | 9/2013 | Wilson et al. | |
| 8,794,280 B2* | 8/2014 | Flory | B60C 23/00354 |
| | | | 152/415 |
| 8,973,633 B2 | 3/2015 | Wilson et al. | |
| 9,358,848 B2* | 6/2016 | Voith | B60C 23/00372 |
| 9,434,216 B2* | 9/2016 | Wilson | B60C 23/00372 |
| 10,436,266 B2 | 10/2019 | Hester et al. | |
| 10,471,783 B2* | 11/2019 | Worth | B60C 23/00372 |

(Continued)

FOREIGN PATENT DOCUMENTS

| | | |
|---|---|---|
| GB | 1321527 | 6/1973 |
| WO | 2010036870 | 4/2010 |
| WO | 2011050983 | 5/2011 |

OTHER PUBLICATIONS

Vernay VA3117 Combo Check Valve Product Information Sheet, last revised Aug. 2013.

*Primary Examiner* — Jason R Bellinger
(74) *Attorney, Agent, or Firm* — Dureska & Moore, LLC; David P. Dureska; Benjamin J. Chojnacki

(57) ABSTRACT

A tire inflation system for a heavy-duty vehicle having a source of fluid pressure, a tire and wheel assembly, and a fluid path. The fluid path includes at least one conduit, a first valve, and a flow detection structure. The conduit provides fluid communication from the source of fluid pressure to the tire and wheel assembly. The first valve is disposed along the fluid path. The flow detection structure is disposed along the fluid path and is arranged in parallel to the first valve.

23 Claims, 8 Drawing Sheets

(56) References Cited

U.S. PATENT DOCUMENTS

| | | | |
|---|---|---|---|
| 10,710,417 B2* | 7/2020 | Benevelli | B60C 23/00372 |
| 2004/0173296 A1 | 9/2004 | White et al. | |
| 2012/0024445 A1 | 2/2012 | Wilson et al. | |
| 2013/0343931 A1* | 12/2013 | Wilson | B60C 23/00372 |
| | | | 417/437 |
| 2019/0118586 A1 | 4/2019 | Wilson et al. | |
| 2019/0263197 A1* | 8/2019 | Sharkey | B60C 23/007 |
| 2019/0360605 A1 | 11/2019 | Wilson et al. | |
| 2020/0096128 A1 | 3/2020 | Cervantez et al. | |

* cited by examiner

TIRE INFLATION SYSTEM WITH PARALLEL FLOW PATH

CROSS-REFERENCE TO RELATED APPLICATION

This application claims the benefit of U.S. Patent Application Ser. No. 62/837,226, filed Apr. 23, 2019.

BACKGROUND

The subject disclosure relates generally to tire inflation systems for heavy-duty vehicles. In particular, the subject disclosure relates to a heavy-duty vehicle tire inflation system having multiple supply conduits arranged in parallel to provide fluid flow detection and a high-capacity fluid flow path.

The use of tire inflation systems in heavy-duty vehicles is known. For the purposes of clarity and convenience, reference is made to a heavy-duty vehicle with the understanding that such reference includes a truck, tractor-trailer or semi-trailer, trailer, and the like. Heavy-duty vehicles typically include multiple tires, each of which requires inflation with fluid air to a target pressure for optimal performance. Heavy-duty vehicles may be quickly placed into service. The tires must be brought to and maintained at target pressure, or the heavy-duty vehicle may operate with improperly inflated tires.

Under-inflation of the tires of the heavy-duty vehicle may reduce fuel economy and increase tire wear. In the event under-inflation continues unabated, the tires may potentially experience damage or reduced service life as the heavy-duty vehicle travels over the road. Thus, it is desirable to enable pressurized air to flow into the under-inflated tires to inflate the tires to, and maintain the tires at, the target pressure.

Over-inflation of the tires of the heavy-duty vehicle may potentially adversely affect performance and service life of the tires. Over-inflation may potentially cause tires to be more prone to damage by sudden impacts. Over-inflation of tires typically reduces the surface area of the tires contacting a road, resulting in the load carried by the heavy-duty vehicle tire being distributed over a smaller area of tire tread. As a result, the tires may potentially experience increased and/or irregular wear and decreased traction and handling. Thus, it is desirable to enable pressurized air to flow out of the over-inflated tires to deflate the tires to, and maintain the tires at, the target pressure.

Prior art tire inflation systems are designed to maintain the target pressure in the tires of the heavy-duty vehicle to prevent under- and over-inflation. Prior art tire inflation systems generally inflate an under-inflated tire by providing air from a vehicle supply of pressurized air to the under-inflated tire using electrical and/or mechanical/pneumatic components. Prior art systems may also deflate an over-inflated tire when a monitored tire pressure rises above the target pressure by a predetermined amount.

Prior art tire inflation systems using mechanical/pneumatic components typically have a flow detection device, such as a flow switch or pressure transducer. The flow detection device is generally disposed within the inflation fluid path and is activated when the system actively inflates tires. The flow detection device typically includes a mechanism, such as a vane switch, pressure switch, or differential pressure switch, that generates a signal indicative of flow through the fluid path. The signal is transmitted to another device, such as a lamp or other indicator or communication system, which may then be illuminated or activated. The indicator informs, for example, an operator of the heavy-duty vehicle that the tire inflation system is actively supplying air to fill at least one tire. If the indicator remains activated for an extended period of time, the operator of the heavy-duty vehicle must determine if inspection of the tires or tire inflation system components is warranted.

Prior art tire inflation systems, while satisfactory for their intended functions, have certain disadvantages, drawbacks, and limitations. For example, flow detection devices of the prior art tire inflation systems typically create a restriction in the fluid path between the source of fluid pressure and the tires, reducing system flow capacity. This reduced flow capacity of prior art tire inflation systems generally increases the amount of time the heavy-duty vehicles require to achieve target pressure in the tires. Thus, when the tires of heavy-duty vehicles in operation or located at a site for extended periods of time become under- or over-inflated, the prior art tire inflation system may require a relatively long period of time to inflate or deflate the tires to target pressure. As a result, the heavy-duty vehicles may operate with improperly inflated tires, potentially causing decreased performance of the tires and increased and/or irregular wear and/or damage to the tires. Thus, there is a need for a tire inflation system with a high system flow capacity and a flow detection device that does not limit or restrict the flow capacity of the tire inflation system.

SUMMARY

This summary is provided to introduce concepts disclosed in the description but is intended neither to identify key factors or essential features of the subject disclosure, nor to limit the scope of the subject disclosure.

A tire inflation system for a heavy-duty vehicle having a source of fluid pressure, a tire and wheel assembly, and a fluid path. The fluid path includes at least one conduit, a first valve, and a flow detection structure. The conduit provides fluid communication from the source of fluid pressure to the tire and wheel assembly. The first valve is disposed along the fluid path. The flow detection structure is disposed along the fluid path and is arranged in parallel to the first valve.

DESCRIPTION OF THE DRAWINGS

The following description and drawings set forth certain illustrative embodiments, aspects, and implementations of the subject disclosure. These are indicative of but a few of the various ways in which one or more aspects may be employed. Further features of the subject disclosure will become apparent to those skilled in the art to which the subject disclosure relates from reading the following description with reference to the accompanying drawings, in which.

Similar reference characters identify similar parts throughout.

DESCRIPTION

Figure 1:
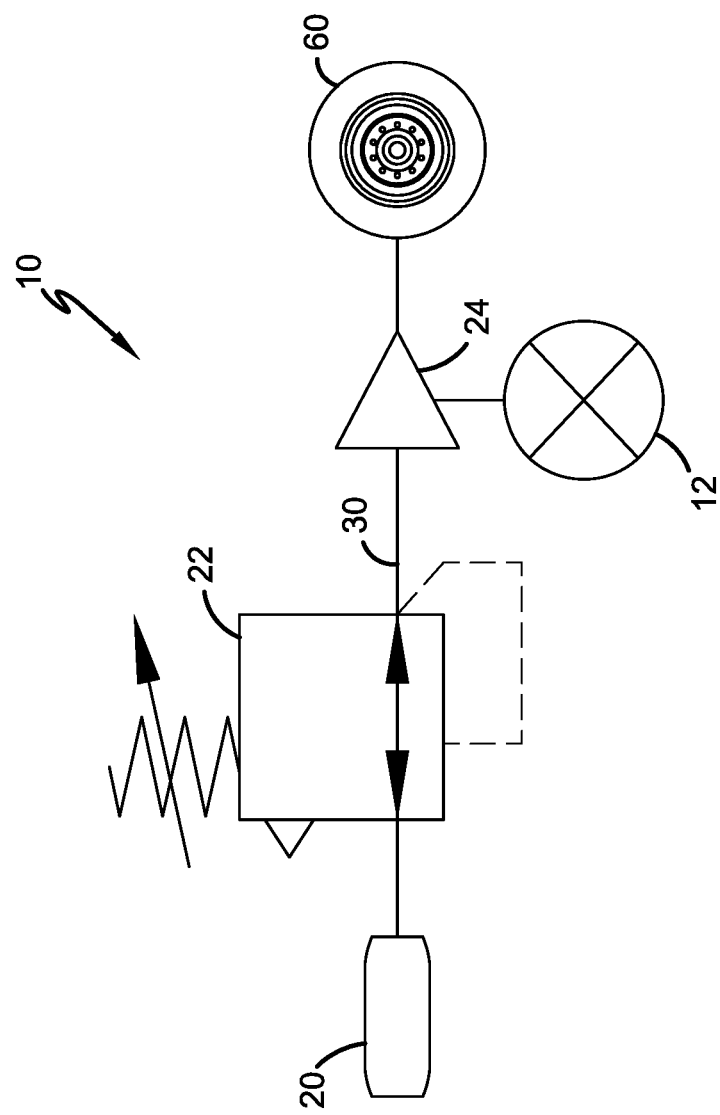
FIG. 1 is a schematic view of a portion of a prior art tire inflation system.

In order to better understand the tire inflation system of the subject disclosure and the environment in which it operates, a prior art tire inflation system 10 is illustrated in FIG. 1. Prior art tire inflation system 10 includes a source of fluid pressure 20, a controller or regulator 22, and an in-line flow detection structure or flow switch 24.

The source of fluid pressure 20 is in fluid communication with one or more tires 60 (only one shown) through a conduit or fluid path 30. The source of fluid pressure 20 may include compressed gas, such as air or nitrogen, which may be stored in a pressure vessel or reservoir. The source of fluid pressure 20 may include a pump (not shown) or compressor (not shown) of a heavy-duty vehicle (not shown). The source of fluid pressure 20 may include the fluid path 30 or any conduit that is capable of selective fluid communication with the tires 60. The source of fluid pressure 20 is selected to be of a sufficient volume and pressure to operate components and systems of the heavy-duty vehicle. Such components and systems may include one or more suspension structures or air springs (not shown) of an air ride suspension, the tire inflation system 10, and air actuated brakes (not shown).

The regulator 22 is disposed in-line along the fluid path 30 in fluid communication between the source of fluid pressure 20 and the tires 60. The regulator 22 selectively establishes a target pressure, such as a minimum or maximum threshold pressure of the tires 60. The target pressure may also be an optimal pressure level in the tires 60 that provides optimal handling and/or fuel economy. The regulator 22 may be utilized to establish multiple target pressures, such as both the minimum or maximum threshold pressure and the optimal pressure level.

The flow switch 24 is typically disposed within the fluid path 30 between the source of fluid pressure 20 and tires 60 to detect fluid flow when tire inflation occurs. More specifically, the flow switch 24 generally has one or more elements or components located within the fluid path 30 and exposed to fluid flow. The flow switch 24 is connected to an indicator 12. The indicator 12 typically includes a lamp (not shown) operatively connected to a voltage source (not shown) or other non-visual indicator or communication system, as is known. The flow switch 24 may have one or more preset threshold flow rates or fluid pressures. The preset threshold flow rate or fluid pressure may correlate to the one or more flow rate values that the system would indicate to the vehicle operator. When the fluid flow or pressure through or in the flow switch 24 is at or above the preset threshold flow rate or fluid pressure, the flow switch is activated. The indicator 12 is then activated, activating the lamp or other non-visual indicator or communication system to provide an indication, for example, to an operator of the heavy-duty vehicle, that tire inflation is occurring. When the fluid flow or fluid pressure through or in the flow switch 24 is below the preset threshold flow rate or fluid pressure, the flow switch, the indicator 12, and the lamp are not activated.

While satisfactory for its intended function, the tire inflation system 10 has disadvantages, drawbacks, and limitations. For example, elements of the flow switch 24 disposed within the fluid path 30 may restrict, or reduce, the flow capacity of the tire inflation system 10. In the event that the heavy-duty vehicle does not have optimal pressure in the tires 60, the reduced flow capacity caused by flow switch 24 increases the amount of time required to inflate or deflate the tires to the target pressure. Thus, the heavy-duty vehicle may operate for a relatively long period of time before the target pressure in the tires 60 is reached. As a result, the heavy-duty vehicle may potentially operate without properly inflated tires 60 and may potentially experience increased and/or irregular wear and/or damage and decreased performance of the tires. A tire inflation system having a flow detection device with a high-capacity parallel fluid flow path, according to the subject disclosure, overcomes the disadvantages, drawbacks, and limitations of the prior art.

A tire inflation system 100 (FIGS. 2-4), according to an aspect of the subject disclosure, includes a source of fluid pressure 120. The source of fluid pressure 120 is in fluid communication with one or more tires 160 (only one shown) through a pressurized fluid path 130. A controller or regulator 122 may be disposed in-line along the pressurized fluid path 130.

The source of fluid pressure 120 may include compressed air or nitrogen, which may be stored in a pressure vessel or reservoir. The source of fluid pressure 120 may include a pump (not shown) or compressor (not shown) of a heavy-duty vehicle (not shown). The source of fluid pressure 120 may include the fluid path 130 and regulator 122 or any conduit or set of conduits that are capable of selective fluid communication. The source of fluid pressure 120 is selected to be of a sufficient volume and pressure to operate components and systems of the heavy-duty vehicle. Such components and systems may include a suspension structure or air spring (not shown) of an air ride suspension, the tire inflation system 100, and air actuated brakes (not shown).

The regulator 122 may be any suitable electronic or mechanical/pneumatic component or valve. More preferably, the regulator 122 may be a pilot-operated regulator. The regulator 122 establishes a target pressure, such as a minimum or maximum threshold pressure, for the tires 160. The target pressure may also be an optimal pressure for the tires 160 that provides optimal handling, performance, and/or fuel economy. The regulator 122 may be automatically or manually adjustable between one or more predetermined target pressures. The regulator 122 may be automatically, continuously variable within a range of pressures that includes one or more target pressures. The range of pressures may be from about 70 psi to about 125 psi. One or more input devices (not shown), such as load sensors, wheel speed sensors, air pressure sensors, or other electronic or mechanical devices may be operatively connected to the regulator 122. The input devices may produce electric or mechanical/pneumatic signals that may be used to automatically continuously adjust the pressure, or automatically select among one or more predetermined target pressures. The regulator 122 maintains the tires 160 at the target pressure to increase performance, reduce tire wear, and extend tire life. It is also contemplated that the tire inflation system 100 may include more than one regulator 122 (only one shown) to separately establish multiple target pressures, such as a minimum and/or maximum threshold pressure and/or an optimal pressure, for the tires 160.

The fluid path 130 includes a common feed conduit 125, a low-capacity conduit 126, a high-capacity conduit 127, and a common delivery conduit 129. The conduits 125, 126, 127, 129 may be of any suitable size and shape and formed of any suitable components or materials, such as metal or reinforced rubber tubing, capable of conveying pressurized fluid or gas, and preferably are incorporated into a common manifold block (not shown). The common feed conduit 125 extends from the source of fluid pressure 120 to the low- and high-capacity conduits, 126, 127, respectively. The regulator 122 may be disposed in-line along the common feed conduit 125. The low-capacity and high-capacity conduits 126, 127, respectively, are in fluid communication with and extend in parallel between the common feed conduit 125 and the common delivery conduit 129. The common delivery conduit 129 extends from the low- and high-capacity conduits 126, 127, respectively, and is in fluid communication with the tires 160. As a result of this configuration, fluid pressure supplied to the low and high-capacity conduits 126, 127, respectively, will typically be the same.

The low-capacity conduit 126 is in parallel arrangement with the high-capacity conduit 127. The low-capacity conduit 126 includes a flow switch 124, disposed in-line along or within the low-capacity conduit. The flow switch 124 may be any suitable flow detection device, such as a vane switch, pressure transducer, or differential pressure switch, capable of detecting a flow or pressure of compressed fluid or gas through, or in, the low-capacity conduit 126. The flow switch 124 may have an orifice (not shown) with a reduced dimension or orifice size less than a dimension of the low-capacity conduit 126. The orifice may have a dimension of between about 0.010 inches to about 0.080 inches. The orifice may allow bi-directional fluid flow through the orifice in either direction toward (inflation) or away from (deflation) the tires 160. More specifically, the flow switch 124 may allow pneumatic balancing between the common feed conduit 125 and the delivery conduit 129 or slight fluid pressure adjustments between the regulator 122 and the tires through the low-capacity conduit 126. Alternatively, the orifice may have a directional restriction, limiting fluid communication through the low-capacity conduit 126 to a single direction either toward (inflation) or away from (deflation) the tires 160.

The flow switch 124 may be connected to an electronic or mechanical/pneumatic indicator 112. The indicator 112 may include a voltage source (not shown) and a lamp (not shown) or other mechanical/pneumatic notification means. The flow switch 124 may be operatively connected to a processor or electronic device or system for wired or wireless communication with, for example, fleet management software.

The flow switch 124 may have one or more preset threshold flow rates or fluid pressure differential. The preset threshold flow rate may be in the range from about 0.1 CFM to about 1 CFM. The preset threshold fluid pressure differentials may be in the range of from about 2 psi to about 10 psi less than, or more than, the target pressure of the regulator 122. When the fluid flow through the flow switch 124 increases above the preset threshold flow rate, or the fluid pressure differential increases above the threshold fluid pressure differential, the flow switch activates. As a result, the indicator 112 is activated, illuminating the lamp to provide a visual indication that tire inflation is occurring. When the fluid flow or fluid pressure differential through flow switch 124 is below the preset threshold flow rate or fluid pressure differential, the flow switch and the indicator 112 are not activated, and the lamp is not illuminated.

The high-capacity conduit 127 is in parallel arrangement with the low-capacity conduit 126. The high-capacity conduit 127 includes a valve 134 disposed in-line along the high-capacity conduit to selectively control fluid flow between the source of fluid pressure 120 and the tires 160. The valve 134 may be any suitable electronic or mechanical/pneumatic component or valve, such as a solenoid or check valve, for directional and/or selective fluid flow control. More preferably, the valve 134 may be a one-way shuttle or check valve for preventing fluid flow in the direction away from (deflation) the tires 160 toward the source of fluid pressure 120. The valve 134 may include a biasing or spring element 136 that provides a bias or resistance against fluid flow in the direction from the source of fluid pressure 120 to the tires 160. The valve 134 may be configured such that the bias of the spring element 136 may be overcome at a predetermined fluid pressure differential across the valve. Alternatively, the valve 134 may be a two-way or combination check valve that is responsive to different predetermined fluid pressure differentials in each direction to allow bidirectional fluid flow. It is also contemplated that the high-capacity conduit 127 and low-capacity conduit 126 may be a single conduit or may be separate conduits arranged coaxially. In such an arrangement, the flow switch 124 and valve 134 may be combined into a single component.

The predetermined fluid pressure differential of the spring element 136 of the valve 134 may correspond to the preset threshold flow rate or fluid pressure of the flow switch 124. The predetermined fluid pressure differential of the spring element 136 may be in the range of from about 1 psi to about 10 psi, more preferably in the range of from about 1 psi to about 5 psi. When the bias of the spring element 136 is overcome, the valve 134 opens allowing fluid flow from the source of fluid pressure 120 through the common feed conduit 125, the regulator 122, and the high-capacity conduit 127 to the common delivery conduit 129 and the tires 160. It is also contemplated that the valve 134 may be electrically and/or pneumatically connected to the flow switch 124 such that activation of the flow switch may actuate or open the valve.

Figure 2:
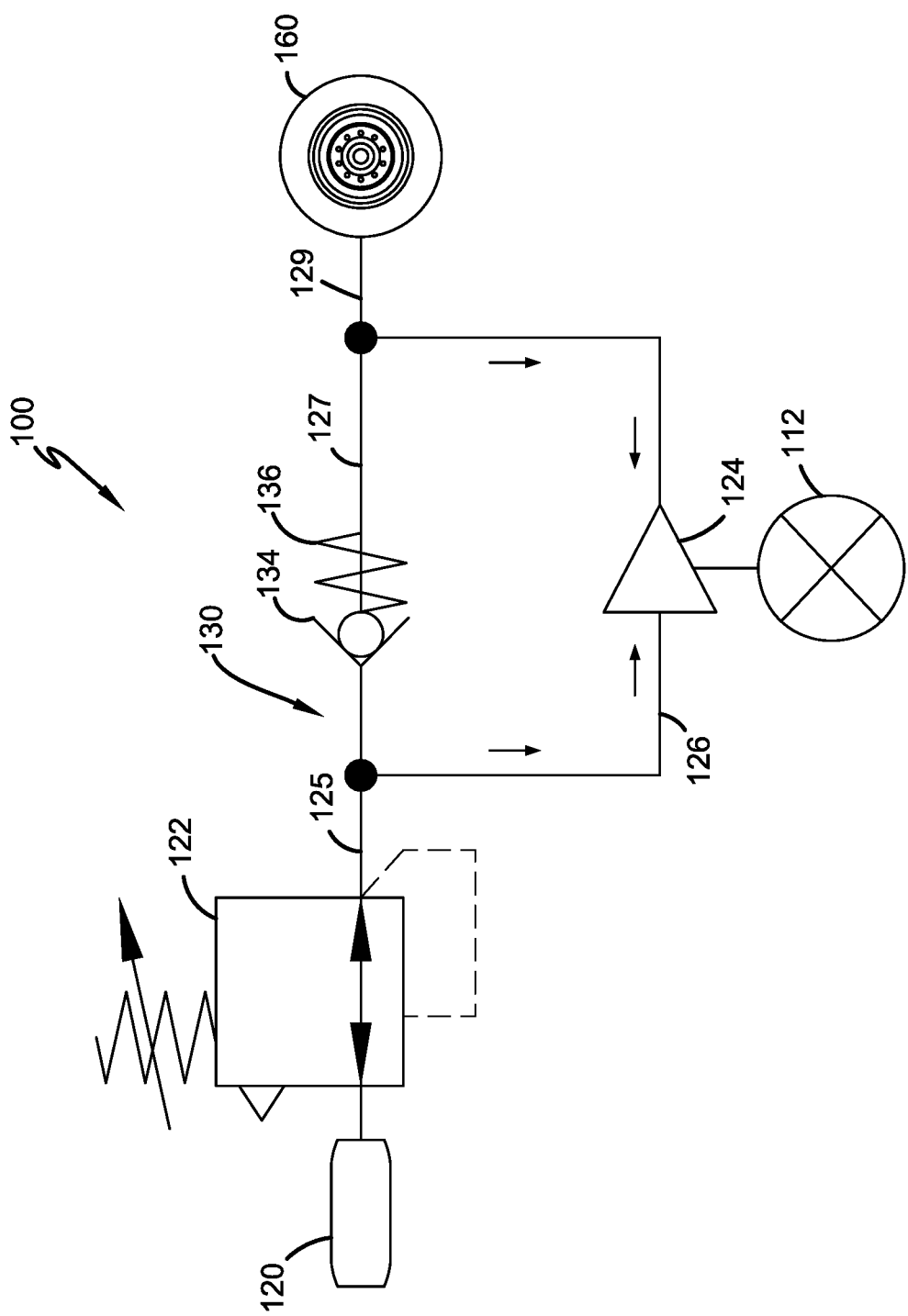
FIG. 2 is a schematic view of a portion of a tire inflation system, according to an aspect of the subject disclosure, showing the tire inflation system in one state of operation.

During operation, the tire inflation system 100 provides rapid inflation of the tires 160 of the heavy-duty vehicle. The source of fluid pressure 120 provides fluid pressure or fluid flow to the regulator 122 through the common feed conduit 125. The regulator 122 adjusts the fluid pressure in accordance with one or more target pressures. The regulator 122 supplies fluid flow or fluid pressure through the common feed conduit 125 and the low- and high-capacity conduits 126, 127, respectively, to the common delivery conduit 129, as described in detail below, to inflate the tires 160. When the fluid pressure in the tires 160, and thus the delivery conduit 129, and common feed conduit 125 are equivalent, as shown in FIG. 2, no fluid flow occurs between the source of fluid pressure 120 and the tires. Fluid flow may occur between or among the tires 160 to allow pneumatic balancing.

Figure 3:
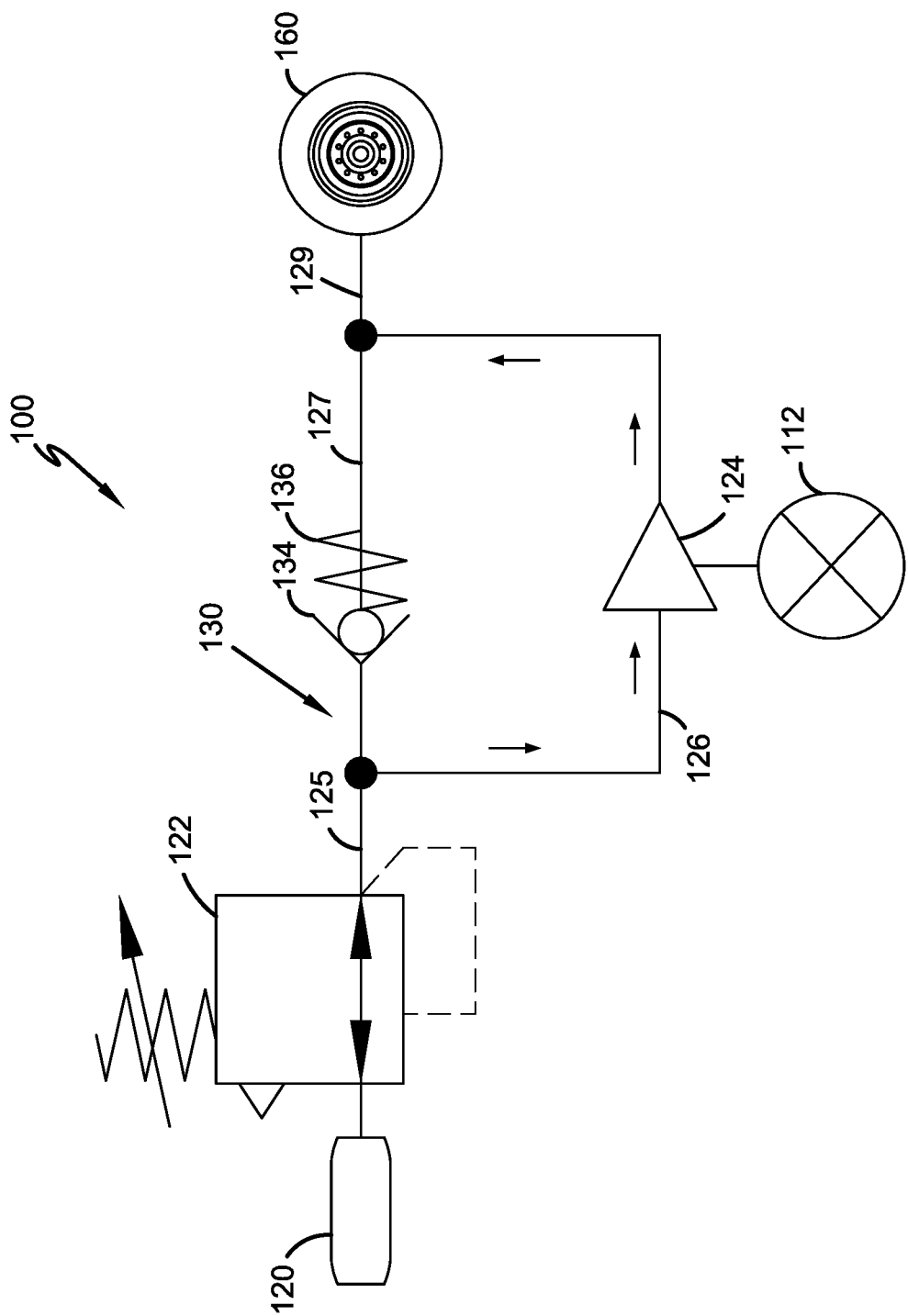
FIG. 3 is a schematic view of a portion of the tire inflation system shown in FIG. 2, showing the tire inflation system in another state of operation.
Figure 4:
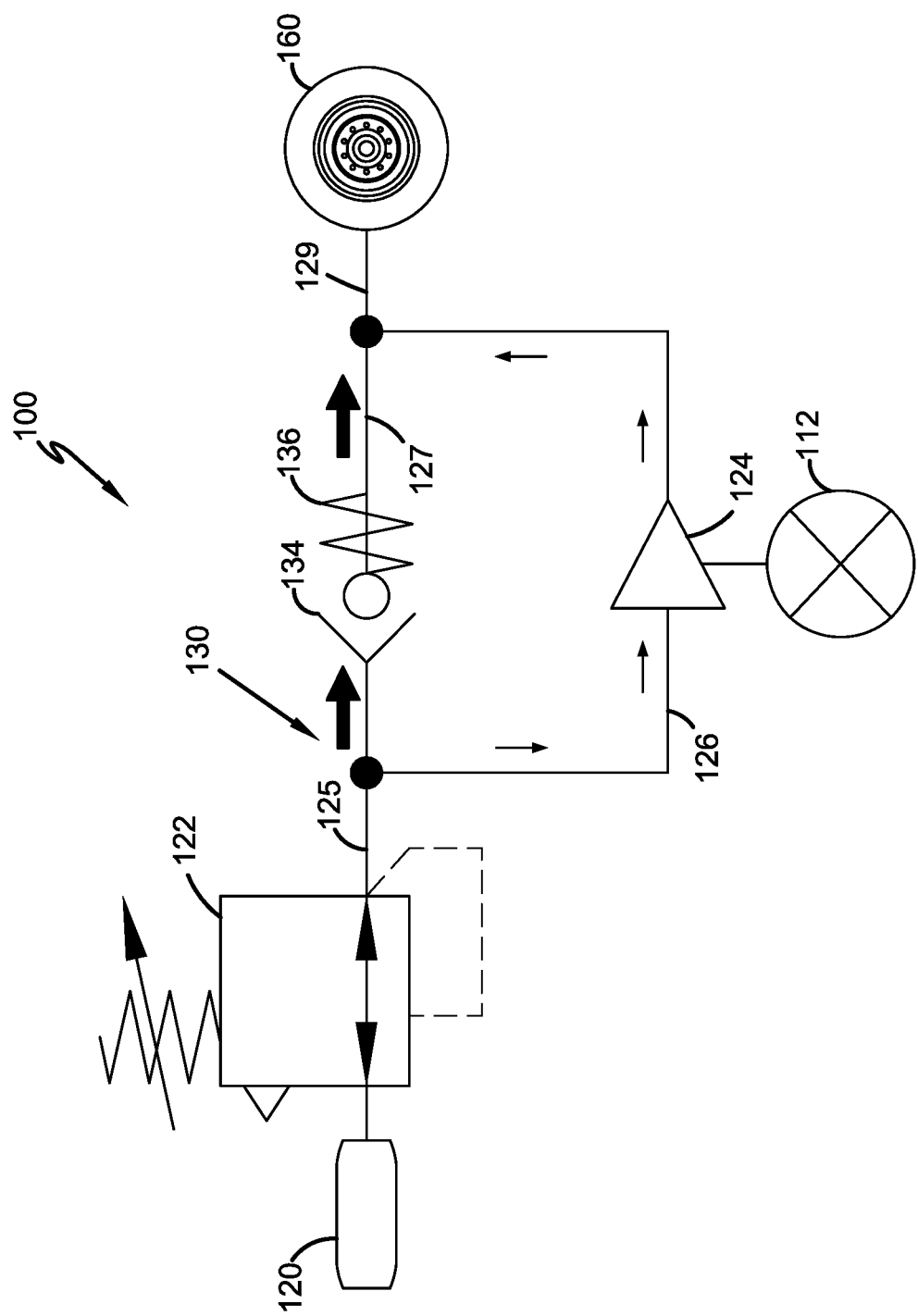
FIG. 4 is a schematic view of a portion of the tire inflation system shown in FIGS. 2-3, showing the tire inflation system in yet another state operation.

In the event that the fluid pressure in the tires 160 falls below the target pressure established by the regulator 122, the fluid pressure in the common delivery conduit 129 falls below the fluid pressure in common feed conduit 125. As a result, a pressure differential forms across the valve 134 between the common feed conduit 125 and the common delivery conduit 129. If the pressure differential across the valve 134 is below the predetermined pressure differential of the spring element 136, as illustrated in FIG. 3, the valve remains closed. Fluid flow may occur through the low-capacity conduit 126 and flow switch 124 until the fluid pressure in the tires 160 is equivalent to the target pressure established by the regulator 122. If the pressure differential across the valve 134 is greater than the predetermined fluid pressure differential of the spring element 136, as illustrated in FIG. 4, the bias of the spring element is overcome. As a result, the valve 134 opens, allowing fluid flow to occur through the high-capacity conduit 127 to quickly inflate the tires 160. The rate of fluid flow through the high-capacity conduit 127 and valve 134 may be in the range from about 2-fold to about 10-fold over the rate of fluid flow through the low-capacity conduit 126 and the flow switch 124. Fluid flow through the valve 134 may be in the range of from about 10 CFM (283.1 L/min) to about 30 CFM (849.5 L/min), more preferably from about 15 CFM (424.7 L/min) to about 20 CFM (566.3 L/min). Thus, the tires 160 inflate relatively more rapidly than with the prior art tire inflation system 10. Fluid flow may also occur concurrently through the low-capacity conduit 126 and flow switch 124. If the flow rate through the low-capacity conduit 126 and flow switch 124, or the fluid pressure differential across the flow switch, is greater than the predetermined flow rate or fluid pressure differential of the flow switch, the flow switch activates. Activation of the flow switch 124 activates the indicator 112, providing an indication of tire inflation, for example, to the operator of the heavy-duty vehicle.

In the event that the fluid pressure in the tires 160 is above the target pressure of the regulator 122, the fluid pressure in common delivery conduit 129 is above the fluid pressure in common feed conduit 125. As a result, a pressure differential forms across the valve 134 between the common delivery conduit 129 and the common feed conduit 125. Because the valve 134 only allows fluid flow in the direction from the source of fluid pressure 120 to the tires 160, the valve remains closed. Fluid flow may occur through the low-capacity conduit 126 and the flow switch 124 toward the regulator 122. Fluid flow toward the regulator 122 creates back flow or back pressure at the regulator. The regulator 122 may vent or relieve the back flow or back pressure, such that fluid flow may continue through low-capacity conduit 126 until the fluid pressure in the tires 160 is equivalent to the target pressure established by the regulator. It is also contemplated that the valve 134 may vent back flow or back pressure to atmosphere.

Thus, the tire inflation system 100 of the subject disclosure provides the flow switch 124 and the parallel low- and high-capacity conduits 126, 127, respectively, that prevent restrictions of the tire inflation system flow capacity. The parallel arrangement of the low- and high-capacity conduits 126, 127, respectively, provides a relatively increased rate of fluid flow to the tires 160, as compared to the prior art, reducing or minimizing occurrences of the heavy-duty vehicle operating with under-inflated tires, thereby increasing the performance of the tires and reducing potential wear and damage to the tires. The parallel arrangement of the low- and high-capacity conduits 126, 127, respectively, may also enable deflation, thereby reducing or minimizing irregular wear and damage from sudden impacts and increasing traction.

A tire inflation system 200 (FIGS. 5-7), according to another aspect of the subject disclosure, is similar in construction and arrangement to the tire inflation system 100 (FIGS. 2-4). The tire inflation system 200 includes a source of fluid pressure 220. The source of fluid pressure 220 is in fluid communication with one or more tires 260 (only one shown) through a pressurized fluid path 230.

The fluid path 230 includes a common feed conduit 225, a low-capacity conduit 226, a high-capacity conduit 227, a deflation conduit 228, and a common delivery conduit 229. The conduits 225, 226, 227, 228, 229 may be of any suitable size and shape and formed using any suitable components or materials, such as metal or reinforced rubber tubing, capable of conveying pressurized fluid or gas, and preferably are incorporated into a common manifold block (not shown). The common feed conduit 225 extends from the source of fluid pressure 220. A controller or regulator 222 may be disposed in-line along the common feed conduit 225. The regulator 222 maintains one or more target pressures, such as a minimum or maximum threshold pressure or optimal pressure, for the tires 260. The low and high-capacity conduits 226, 227, respectively, and deflation conduit 228 are in fluid communication with and extend in parallel between the common feed conduit 225 and the common delivery conduit 229. The common delivery conduit 229 extends from the low- and high-capacity conduits 226, 227, respectively, and the deflation conduit 228 and is in fluid communication with the tires 260. As a result of this configuration, fluid pressure supplied to the low and high-capacity conduits 226, 227, respectively, and deflation conduit 228 will typically be the same.

The low-capacity conduit 226 is in parallel arrangement with the high-capacity conduit 227 and the deflation conduit 228. The low-capacity conduit 226 includes a flow switch 224, disposed in-line along the low-capacity conduit. The flow switch 224 may be any suitable flow detection structure or device, such as a vane switch or pressure transducer, capable of detecting the flow or pressure of pressurized fluid or gas through or in the low-capacity conduit 226. The flow switch 224 may include an orifice (not shown) with a reduced dimension or orifice size less than a dimension of the low-capacity conduit 226. More preferably, the orifice may have a dimension in the range of from about 0.010 inches to about 0.080 inches. The orifice may allow bi-directional fluid flow through the orifice in either direction toward (inflation) or away from (deflation) the tires 260 to provide pneumatic balancing between the common feed conduit 225 and common delivery conduit 229 or slight fluid pressure adjustments between the regulator 222 and the tires through the low-capacity conduit 226. Alternatively, the orifice may have a directional restriction, limiting fluid communication through low-capacity conduit 226 to a single direction either toward (inflation) or away from (deflation) the tires 260.

The flow switch 224 may be connected to an electronic or mechanical/pneumatic indicator 212. The indicator 212 may include a voltage source (not shown) and a lamp (not shown) or other mechanical/pneumatic notification means. The flow switch 224 may be operatively connected to a processor or electronic device or system for wired or wireless communication with, for example, fleet management software.

The flow switch 224 may have one or more preset threshold flow rates or fluid pressures. The preset threshold flow rate may be in the range from about 0.1 CFM (2.83 L/min) to about 1 CFM (28.3 L/min). The preset threshold fluid pressure differentials may be in the range of from about 1 psi to about 5 psi less than, or more than, the target pressure of the regulator 222. When the fluid flow through the flow switch 224 increases above the preset threshold flow rate, or the fluid pressure increases above the preset threshold fluid pressure, the flow switch activates. As a result, the indicator 212 is activated, illuminating the lamp to provide an indication that tire inflation is occurring. When the fluid flow through or fluid pressure differential across flow switch 224 is below the preset threshold flow rate or fluid pressure differential, the flow switch and the indicator 212 are not activated, and the lamp is not illuminated.

The high-capacity conduit 227 is in parallel arrangement with the low-capacity conduit 226 and the deflation conduit 228. A valve 234 is disposed in-line along the high-capacity conduit 227 to provide selective control of fluid communication between the source of fluid pressure 220 and the tires 260. The valve 234 may be any suitable electronic or mechanical/pneumatic component or valve, such as a solenoid or check valve, capable of providing directional and/or selective fluid flow control. More preferably, the valve 234 may be a one-way shuttle or check valve capable of preventing fluid flow in the direction away from (deflation) the tires 260 toward the source of fluid pressure 220, thereby forcing fluid flow through the flow switch 224. The valve 234 may include a biasing or spring element 236 that provides a bias or resistance against fluid flow in the direction from the source of fluid pressure 220 toward (inflation) the tires 260. The valve 234 may be configured such that the bias of the spring element 236 may be overcome at a predetermined fluid pressure differential across the valve between the common feed conduit 225 and the common delivery conduit 229.

The predetermined fluid pressure differential of the spring element 236 may correspond to the preset threshold flow rate or fluid pressure of the flow switch 224. The predetermined fluid pressure differential may be in the range of from about 1 psi to about 10 psi, more preferably from about 1 psi to about 5 psi. When the bias of the valve 234 is overcome, the valve opens allowing fluid flow from the source of fluid pressure 220 and regulator 222 through the common feed conduit 225 and the high-capacity conduit 227 to the common delivery conduit 229 and the tires 260. It is also contemplated that the valve 234 may be electrically and/or pneumatically connected to the flow switch 224 such that activation of the flow switch may actuate or open the valve to allow fluid flow from the source of fluid pressure 220 and regulator 222 through the high-capacity conduit 227.

The deflation conduit 228 is in parallel arrangement with the low-capacity conduit 226 and the high-capacity conduit 227. A valve 238 is disposed in-line along the deflation conduit 228 and provides selective control of fluid communication between the source of fluid pressure 220 and the tires 260. The valve 238 may be any suitable electronic or mechanical/pneumatic component or valve, such as a solenoid or check valve, capable of providing directional and/or selective fluid flow control. More preferably, the valve 238 may be a one-way shuttle or check valve capable of preventing fluid flow through the valve in a single direction from the source of fluid pressure 220 toward (inflation) the tires 260. The valve 238 may include a biasing or spring element (not shown) configured to provide a bias or resistance to fluid flow in the direction away from (deflation) the tires 260 that is overcome by another pressure differential formed across the valve. Alternatively, the valve 238 may be responsive to any pressure differential formed across the valve between the common delivery conduit 229 and the common feed conduit 225. It is also contemplated that the deflation conduit 228, the high-capacity conduit 227, and the low-capacity conduit 226 may be a single conduit or may be separate conduits arranged coaxially. In such an arrangement, the flow switch 224 and the valves 234, 238 may be combined into a single component that allow bidirectional fluid flow governed by different pressure differentials in each direction.

Figure 5:
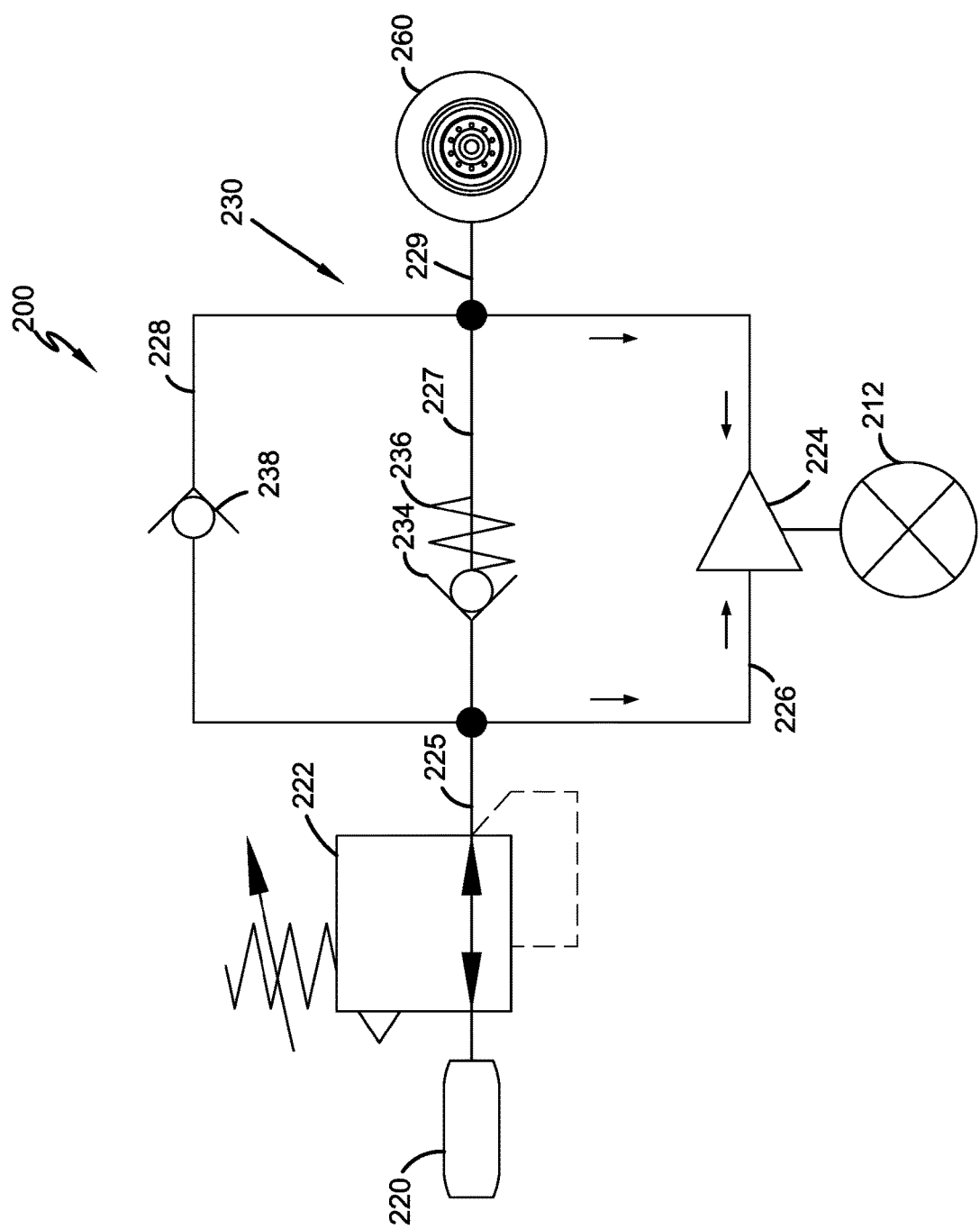
FIG. 5 is a schematic view of a portion of a tire inflation system, according to another aspect of the subject disclosure, showing the tire inflation system in one state of operation.

During operation, the tire inflation system 200 provides rapid inflation and deflation of the tires 260 of the heavy-duty vehicle. The source of fluid pressure 220 provides fluid pressure or fluid flow to the regulator 222 disposed in-line along the common feed conduit 225. The regulator 222 adjusts the fluid pressure delivered through the common feed conduit 225, in accordance with one or more target pressures, to the conduits 226, 227, 228. Fluid flow is supplied through the conduits 226, 227, 228, as described in detail below, to the common delivery conduit 229, which supplies the tires 260. When the fluid pressure in the tires 260, and thus the common delivery conduit 229, and common feed conduit 225 are equivalent, as shown in FIG. 5, no fluid flow occurs between the source of fluid pressure 220 and the tires. Fluid flow may still occur between or among the tires 260 to allow pneumatic balancing.

In the event that the fluid pressure in the tires 260 falls below the target pressure of the regulator 222, the fluid pressure in common delivery conduit 229 falls below the fluid pressure in common feed conduit 225. A pressure differential forms across the valves 234, 238 between the common feed conduit 225 and common delivery conduit 229. If the pressure differential across the valve 234 is below the predetermined pressure differential of the spring element 236, the valve remains closed. Because the valve 238 only allows flow from the tires 260 toward the source of fluid pressure 220, the valve remains closed. Fluid flow may occur through low-capacity conduit 226 and flow switch 224 until the fluid pressure in the tires 260 is equivalent to the target pressure established by the regulator 222.

Figure 6:
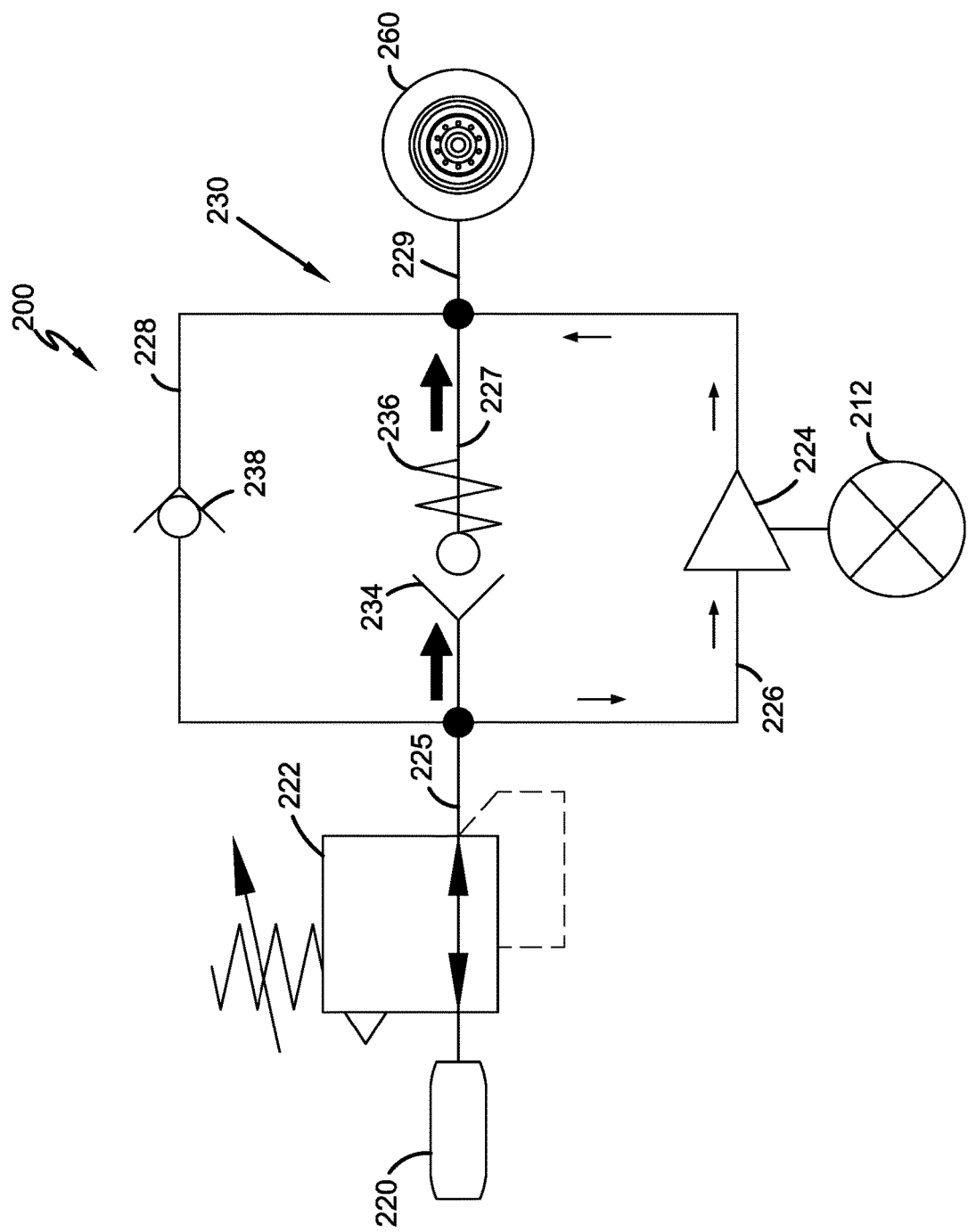
FIG. 6 is a schematic view of a portion of the tire inflation system shown in FIG. 5, showing the tire inflation system in another state of operation.

If the pressure differential across the valve 234 between the common feed conduit 225 and delivery conduit 229 is greater than the predetermined fluid pressure differential of the spring element 236, as illustrated in FIG. 6, the bias of the spring element is overcome. As a result, the valve 234 opens, allowing fluid flow to occur through the high-capacity conduit 227 to the common delivery conduit 229 and the tires 260. The rate of fluid flow through the high-capacity conduit 227 and valve 234 may be in the range of from about 2-fold to about 10-fold over the rate of fluid flow through the low-capacity conduit 226 and the flow switch 224. Fluid flow through the valve 234 may be in the range of from about 10 CFM to about 30 CFM, more preferably from about 15 CFM to about 20 CFM. As a result, the tires 260 inflate relatively more rapidly than with the prior art tire inflation system 10. Fluid flow also occurs through the low-capacity conduit 226 and flow switch 224. If the flow rate or pressure in the low-capacity conduit 226 and flow switch 224 is greater than the predetermined threshold flow rate or fluid pressure of the flow switch, the flow switch activates. Activation of the flow switch 224 activates the indicator 212 to provide an indication of tire inflation, for example, to the operator of the heavy-duty vehicle.

Figure 7:
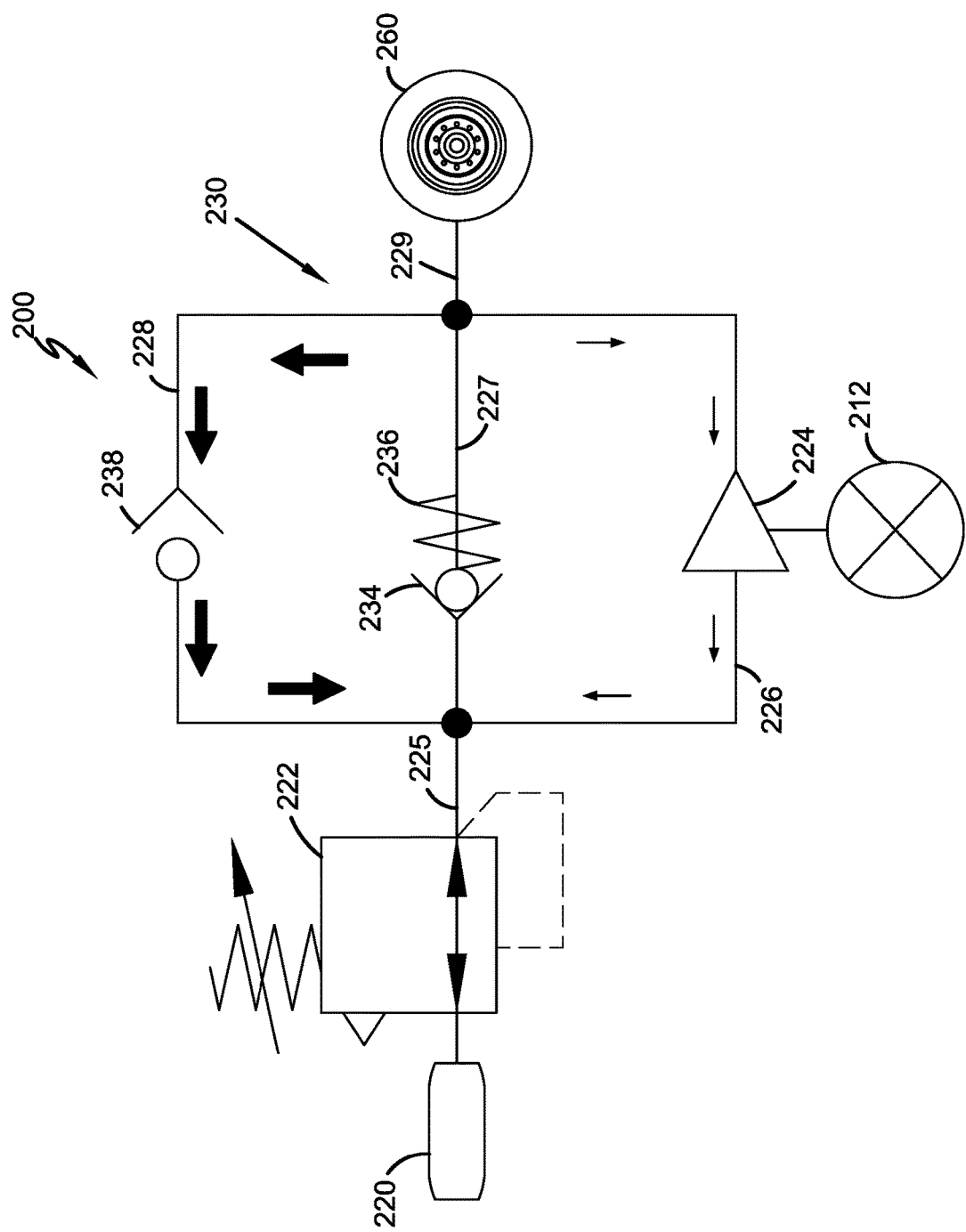
FIG. 7 is a schematic view of a portion of the tire inflation system shown in FIGS. 5-6, showing the tire inflation system in yet another state of operation.

In the event that the fluid pressure in the tires 260 is above the target pressure, the fluid pressure in common delivery conduit 229 is above the fluid pressure in common feed conduit 225. A pressure differential forms across the valves 234, 238 between the common delivery conduit 229 and the common feed conduit 225. Because the valve 234 only allows flow from the source of fluid pressure 220 to the tires 260, the valve remains closed. The pressure differential across the valve 238 causes the valve to open, as illustrated in FIG. 7. Fluid flow occurs through the deflation conduit 228 and the valve 238 from the tires 260 to the common feed conduit 225 and the regulator 222 to rapidly deflate the tires 260. Fluid flow may also occur through the low-capacity conduit 226 and flow switch 224 from the tires 260 to the regulator 222. Fluid flow in the direction from the tires 260 toward the source of fluid pressure 220 creates back flow or back pressure at the regulator 222. The regulator 222 may vent, or relieve, the back flow or back pressure to atmosphere, allowing fluid flow to continue through the deflation conduit 228 until the fluid pressure in the tires 260 is equivalent to the target pressure established by the regulator. It is also contemplated that the valve 238 may be in fluid communication with a quick exhaust valve to vent back flow or back pressure to atmosphere to provide faster deflation.

Figure 8:
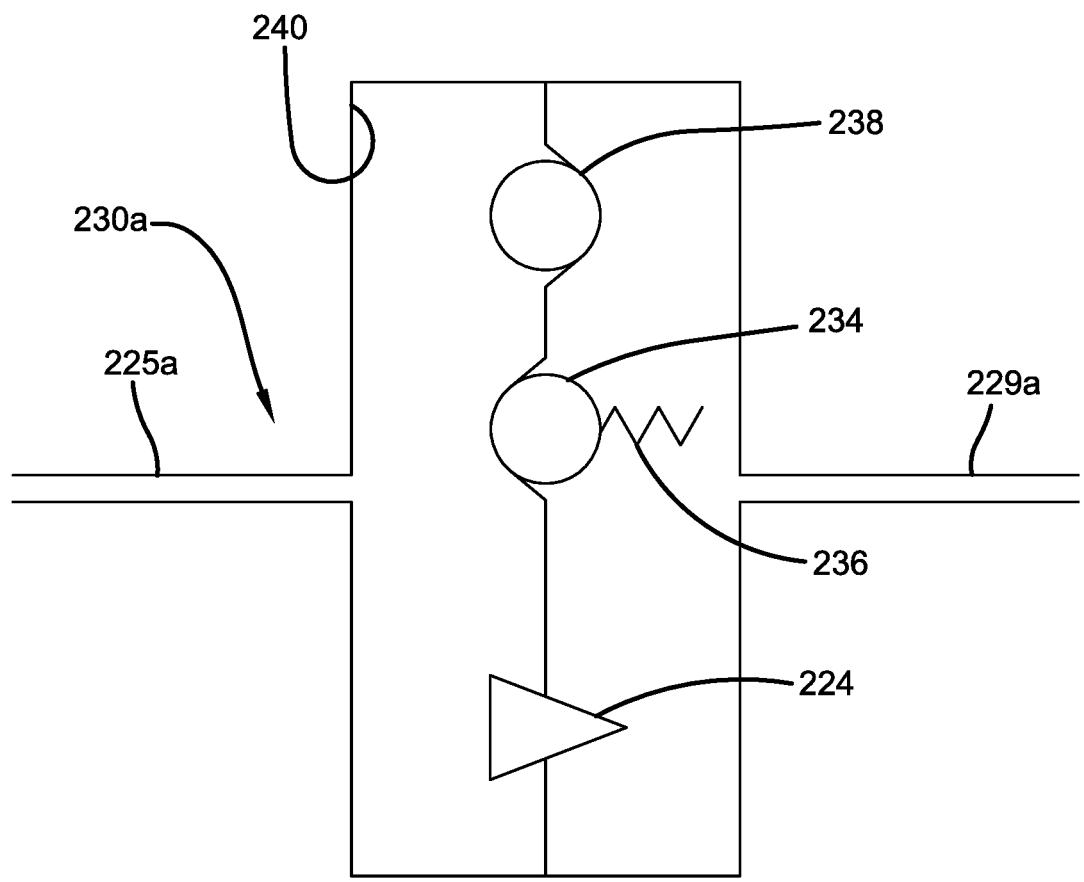
FIG. 8 is a partial schematic view of a portion of an alternate tire inflation system.

Alternatively, and with additional reference to FIG. 8, the same principles of operation may be accomplished using only a single continuous fluid path 230a in fluid communication between the regulator 222 and tires 260. In particular, the fluid path 230a may be formed from a common feed conduit 225a in fluid communication in-line with a common delivery conduit 229a. The fluid path 230a also includes an internal chamber or space 240 that may be a discrete chamber in fluid communication between the common feed conduit 225a and the common delivery conduit 229a, or may be part of the internal space within one or both of the conduits. The flow switch 224 and one or both of the valves 234, 238 may be disposed in parallel across the internal chamber 240 such that the flow switch and valves are not in-line. As a result, the valves 234, 238 and flow switch 224 create a plurality of parallel fluid pathways along which pressurized air may travel within the fluid path 230.

During operation, when the fluid pressure in the common delivery conduit 229a and the common feed conduit 225a are equivalent, no fluid flow occurs through the internal chamber 240. In the event that the fluid pressure in common delivery conduit 229a falls below the fluid pressure in common feed conduit 225a, a pressure differential forms across the flow switch 224 and the valves 234, 238 between the common feed conduit 225a and common delivery conduit 229a. If the pressure differential across the valve 234 is below the predetermined pressure differential of the spring element 236, the valve remains closed. Because the valve 238 only allows flow from the common delivery conduit 229a toward the common feed conduit 225a, the valve remains closed. Fluid flow may occur across the internal chamber 240 through the flow switch 224 at a low capacity until the fluid pressure in the common delivery conduit 229a is equivalent to the pressure in the common feed conduit 225a.

If the pressure differential across the valve 234 between the common feed conduit 225a and delivery conduit 229a is greater than the predetermined fluid pressure differential of the spring element 236, the bias of the spring element is overcome. As a result, the valve 234 opens, allowing fluid flow to occur across the internal chamber 240 at a high capacity through the valve. The rate of fluid flow through the valve 234 may be in the range of from about 2-fold to about 10-fold over the rate of fluid flow through the flow switch 224. Fluid flow through the valve 234 may be in the range of from about 10 CFM to about 30 CFM, more preferably from about 15 CFM to about 20 CFM. Fluid flow also continues to occur across the internal chamber 240 through the flow switch 224. If the flow rate through or pressure differential across the flow switch 224 is greater than the predetermined threshold flow rate or fluid pressure differential of the flow switch, the flow switch activates. Activation of the flow switch 224 activates the indicator 212 to provide an indication of tire inflation, for example, to the operator of the heavy-duty vehicle.

In the event that the fluid pressure in common delivery conduit 229a is above the fluid pressure in common feed conduit 225a, a pressure differential forms across the flow switch 224 and the valves 234, 238 between the common delivery conduit and the common feed conduit. Because the valve 234 only allows flow from the common feed conduit 225a to the common delivery conduit 229a, the valve remains closed. The pressure differential across the valve 238 causes the valve to open, allowing fluid flow to occur across the internal chamber 240 through the valve from the common delivery conduit 229a to the common feed conduit 225a. Fluid flow may also occur across the internal chamber 240 through the flow switch 224.

Thus, the tire inflation system 200, according to an aspect of the subject disclosure, provides the flow switch 224 and the parallel conduits 226, 227, 228 that prevent or minimize restriction of the flow capacity of the tire inflation system. The parallel arrangement of the low and high-capacity conduits 226, 227, respectively, and deflation conduit 228 provides a relatively increased rate of fluid flow to and from the tires 260, as compared to the prior art. Moreover, the parallel arrangement of flow switch 224 and valves 234, 238 along single fluid path 230a in the alternative embodiment of tire inflation system 200 also provides a relatively increased rate of fluid flow to and from the tires 260, as compared to the prior art. The relatively increased rate of fluid flow of tire inflation system 200, and the alternative embodiment thereof, reduces or minimizes occurrences of the heavy-duty vehicle operating with under-inflated tires or over-inflated tires, thereby increasing performance of the tires and reducing wear and damage to the tires.

It is to be understood that the structure and operation of the tire inflation systems 100, 200 may be altered or rearranged, or certain components omitted or added, without affecting the overall concept or operation of the subject disclosure. It is also to be understood that the subject disclosure finds application in all types of tire inflation systems, including types of tire inflation systems other than those shown and described, without affecting the concept or operation of the subject disclosure.

Accordingly, the improved tire inflation system of the subject disclosure is simplified; provides an effective, safe, inexpensive, and efficient structure and method that achieve all the enumerated objectives; provides for eliminating difficulties encountered with prior art tire inflation systems; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the subject disclosure has been described and illustrated with reference to specific aspects. It is understood that these descriptions and illustrations are by way of example and not by way of limitation. Potential modifications and alterations will occur to others upon a reading and understanding of the subject disclosure, and it is understood that the subject disclosure includes all such modifications, alterations, and equivalents.

Having now described the features, discoveries, and principles of the invention; the manner in which the tire inflation system is used and installed; the characteristics of the construction, arrangement, and method steps; and the advantageous, new and useful results obtained, the new and useful structures, devices, elements, arrangements, process, parts and combinations are set forth in the appended claims.

What is claimed is:

1. A tire inflation system for a heavy-duty vehicle comprising:
   a source of fluid pressure;
   a tire and wheel assembly; and
   a fluid path, said fluid path comprising:

at least one conduit for fluid communication from said source of fluid pressure to said tire and wheel assembly;
a first valve disposed along said fluid path; and
a flow detection structure disposed along the fluid path, said flow detection structure being arranged in parallel to said first valve.

2. The tire inflation system of claim 1 further comprising said first valve and said flow detection structure being disposed within a chamber, said chamber being disposed along said fluid path.

3. The tire inflation system of claim 1 further comprising said first valve and said flow detection structure being disposed within an internal space of said at least one conduit.

4. The tire inflation system of claim 1, said fluid path further comprising a second valve for fluid communication in the direction from said tire and wheel assembly toward said source of fluid pressure, said second valve being disposed along said fluid path and arranged in parallel with said first valve and said flow detection structure.

5. The tire inflation system of claim 4, one or more of said flow detection structure, said first valve, and said second valve comprising a single device.

6. The tire inflation system of claim 1 said fluid path further comprising a second conduit for fluid communication between the source of fluid pressure and the tire and wheel assembly, said second conduit being arranged in parallel with said at least one conduit;
wherein said first valve is disposed in line along the at least one conduit; and
said flow detection structure is disposed in line along the second conduit.

7. The tire inflation system of claim 6 further comprising a controller in fluid communication with said at least one conduit and said second conduit, said controller providing a predetermined fluid air pressure to the at least one conduit and the second conduit.

8. The tire inflation system of claim 7, the controller comprising a pilot-operated regulator.

9. The tire inflation system of claim 7, said predetermined fluid air pressure being within a range pressures of from 70 psi to 125 psi.

10. The tire inflation system of claim 7, said first valve selectively controlling fluid communication in a direction from said source of fluid pressure to said tire and wheel assembly.

11. The tire inflation system of claim 10, said flow detection structure providing restricted fluid communication between said source of fluid pressure and said tire and wheel assembly.

12. The tire inflation system of claim 11, said flow detection structure further comprising a flow switch.

13. The tire inflation system of claim 11, said first valve selectively controlling fluid communication based on a specified fluid pressure differential across the first valve between said source of fluid pressure and said tire and wheel assembly.

14. The tire inflation system of claim 13, said specified fluid pressure differential being in the range of 2 psi to 10 psi.

15. The tire inflation system of claim 13, said flow detection structure being responsive to said specified fluid pressure differential to generate a signal indicative of tire inflation; and
wherein said signal is transmitted to and received by an indicator capable of activating in response to the signal.

16. The tire inflation system of claim 13, said flow detection structure allowing pressure equalization between said source of fluid pressure and the tire and wheel assembly at a fluid pressure differential less than the specified fluid pressure differential.

17. The tire inflation system of claim 11, said first valve providing a fluid flow through said at least one conduit in the range of 10 CFM to 30 CFM.

18. The tire inflation system of claim 6, said at least one conduit and said second conduit being arranged coaxially.

19. The tire inflation system of claim 4 said fluid path further comprising:
a second conduit for fluid communication between the source of fluid pressure and the tire and wheel assembly, said second conduit being arranged in parallel with said at least one conduit;
a deflation conduit for fluid communication in a direction from said tire and wheel assembly to said source of fluid pressure, said deflation conduit being in fluid communication with a controller and being arranged in parallel with said at least one conduit and said second conduit;
wherein said first valve is disposed in line along the at least one conduit, said flow detection structure is disposed in line along the second conduit, and said second valve is disposed in-line along the deflation conduit.

20. The tire inflation system of claim 19, said second valve allowing fluid communication only from said tire and wheel assembly to said source of fluid pressure.

21. The tire inflation system of claim 19, said second valve also being in fluid communication with an exhaust valve.

22. The tire inflation system of claim 19, said at least one conduit, said second conduit, and said deflation conduit being arranged coaxially.

23. The tire inflation system of claim 22, said flow detection structure and said first and second valve comprising a single device.

* * * * *